United States Patent [19]

Bezman

[11] Patent Number: 4,556,646
[45] Date of Patent: Dec. 3, 1985

[54] MANUFACTURE OF NOBLE METAL/ZEOLITE CATALYSTS

[75] Inventor: Richard D. Bezman, Pt. Richmond, Calif.

[73] Assignee: Chevron Research Company, San Francisco, Calif.

[21] Appl. No.: 672,772

[22] Filed: Nov. 19, 1984

[51] Int. Cl.⁴ .................. B01J 29/12; B01J 29/22
[52] U.S. Cl. ................................ 502/66; 502/74
[58] Field of Search ............................ 502/66, 74

[56] References Cited

U.S. PATENT DOCUMENTS 3,259,564 7/1966 Kimberlin, Jr. .......... 502/66 X
3,637,878 1/1972 Hansford .................. 502/66 X
3,781,199 12/1973 Ward ....................... 502/66 X
3,830,724 8/1974 Schutt ..................... 502/66 X
3,864,283 2/1975 Schutt ..................... 502/66
4,252,688 2/1981 Gallei et al. ............. 502/66

FOREIGN PATENT DOCUMENTS 2500326 8/1982 France .

Primary Examiner—Carl F. Dees
Attorney, Agent, or Firm—S. R. LaPaglia; W. K. Turner; V. J. Cavalieri

[57] ABSTRACT

A simplified method of manufacture of noble metal/zeolite catalysts involves impregnation of the formed catalyst base with a solution of the noble metal and an ammonium salt. Catalysts having a highly uniform radial distribution of the noble metal are prepared.

20 Claims, 1 Drawing Figure

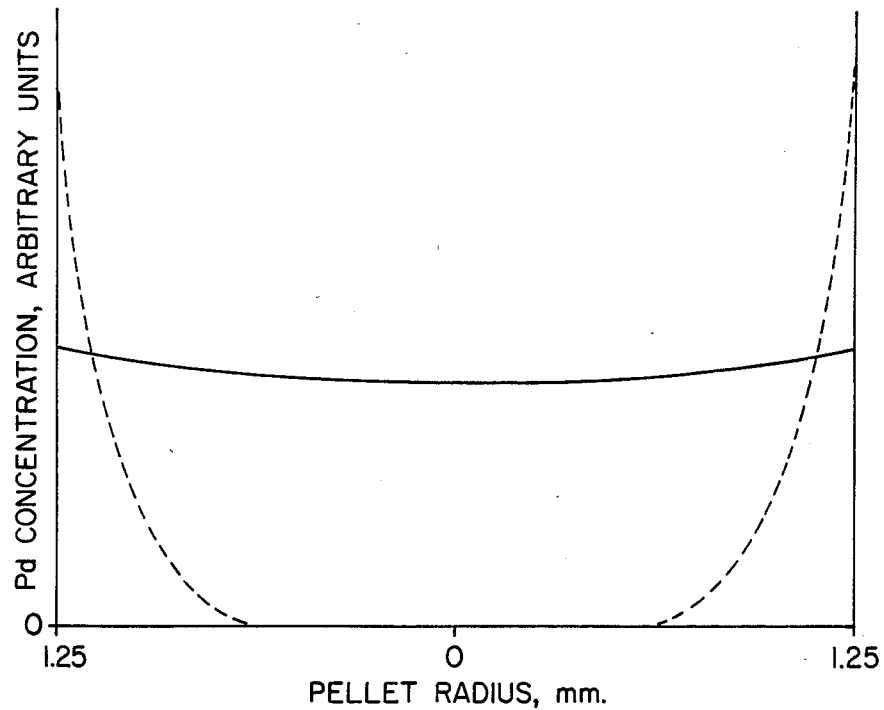

MANUFACTURE OF NOBLE METAL/ZEOLITE CATALYSTS

FIELD OF THE INVENTION

This invention relates to the manufacture of noble metal/zeolite catalysts, and particularly to a process of manufacture which produces an even distribution of the noble metal in the catalyst particles.

BACKGROUND OF THE INVENTION

Noble metal-containing zeolite catalysts have been in use in the petroleum industry for many years. Particular uses include alkane dehydrocyclization (see, e.g., U.S. Pat. No. 4,458,025 to Lee et al.) and hydrocracking.

Esso (now Exxon), Union Oil Company of California, and Union Carbide Corporation have all been active in the development of noble metal/zeolite catalysts, and some of their developments are given in U.S. Pat. Nos. 3,213,013 to Arey, Jr.; 3,326,818 to Gladrow et al.; 3,547,807 and 3,547,808 to Hansford; 3,929,672 to Ward; 3,963,644 to Hansford; 4,419,271 to Ward; and 4,401,556 to Bezman et al. Y-type zeolites, synthetic faujasites are particularly known as hydrocracking catalyst bases. Zeolite Y itself is disclosed in U.S. Pat. No. 3,130,007 to Breck, and modified, ultra-stable Y-type zeolites are disclosed in, inter alia, U.S. Pat. Nos. 3,293,192 to Maher et al.; 3,449,070 to McDaniel et al.; British Patent No. 2,014,970; and U.S. patent application Ser. No. 846,312, filed Oct. 28, 1977. These modified Y-type zeolites are known to be particularly satisfactory for midbarrel hydrocracking.

Although some of the early zeolite hydrocracking catalysts employed solely a zeolite as the catalyst base, it is now common to use as a catalyst base (that part of the catalyst other than the noble metal) a zeolite and an inorganic oxide binder. The more common binders are alumina, silica, magnesia, zirconia, beryllia, titania, and mixtures thereof.

The preparation of these catalysts has been described in several of the previously-mentioned patents, albeit usually in such terms as "any one of numerous procedures".

French Published Application No. 2 500 326 summarizes the art of manufacture of these catalysts, and discloses a technique wherein the catalyst base is formed and the noble metal then introduced by competitive ion exchange with a noble metal complex cation and a competitor cation chosen from at least one of ammonium, alkaline earth and rare earth ions. The catalyst is then washed, dried (and, optionally, calcined), cooled, and rehydrated before reduction and use.

U.S. Pat. No. 4,252,688 to Gallei et al. describes an alternative manufacturing technique in which the catalyst base is prepared and calcined, then impregnated with a noble metal salt solution of volume identical to the water absorption capacity of the base (pore-filled), dried, and re-calcined. The catalyst may then be reduced and used.

The disclosures of the above-mentioned patents and patent application are incorporated herein by reference.

It would be desirable to develop a process for the manufacture of a noble metal/zeolite/oxide matrix catalyst which requires the minimum number and complexity of manufacturing steps, while still affording a catalyst having a satisfactory metal distribution and minimizing loss of the noble metal.

SUMMARY OF THE INVENTION

In a first aspect, this invention provides an improved process for preparing a catalyst comprising an inorganic oxide component, a zeolite component, and a noble metal component, which process comprises the steps of:

(a) forming a particulate catalyst base containing the inorganic oxide component and the zeolite component;

(b) impregnating the catalyst base with an impregnating solution containing a soluble salt of the noble metal component; and (c) drying and calcining the impregnated catalyst base; and the improvement in which process comprises:

(a') using as the impregnating solution in step (b) a solution which also contains a soluble ammonium salt; and (b') allowing the impregnated base to stand, between steps (b) and (c), for a time sufficient to produce in the finished calcined catalyst a radial distribution of noble metal such that the concentration of noble metal at the center of the catalyst is at least about 30% by weight of the concentration at the outside edges, and preferably at least about 80% by weight of the concentration at the outside edges.

Preferably the inorganic oxide is alumina; the zeolite is Linde LZ-20; the noble metal palladium, and its soluble salt $Pd(NH_3)_4(NO_3)_2$; and the ammonium salt is ammonium nitrate.

Other metals, noble or non-noble, may be added to the zeolite component, the inorganic oxide component, or both.

In a second aspect, this invention provides an improved hydroprocessing catalyst prepared by the method of this invention.

BRIEF DESCRIPTION OF THE DRAWING

The FIGURE shows the radial distribution of palladium in two catalysts: one prepared according to the method of this invention, and the other prepared by a comparative method.

DETAILED DESCRIPTION OF THE INVENTION

In this application, the term "noble metal" shall mean one or more metals selected from the group consisting of ruthenium, rhodium, palladium, osmium, iridium and platinum; the term "impregnation" shall mean the addition to a solid of a volume of solution not substantially greater than that which can be absorbed by the solid, and allowing the solution to be absorbed by or on the solid, followed, without an intermediate washing step, by the drying of the solution onto the solid.

In the method of this invention, a catalyst base is first prepared in substantially the form in which it is intended that it should be used, i.e., the zeolite component shall have undergone such treatment (as, e.g., ion exchange to reduce the sodium content, dealumination, steaming, or other such stabilization techniques, calcination, etc., such as are well-known in the art) and the catalyst base comprising the inorganic oxide component and the zeolite component shall have been steamed, calcined, etc. to achieve the desired pore size distribution, surface area and similar properties. This preparation may be performed by any suitable methods known to the art, as set forth in, for example, the patents previously cited. Either the zeolite component, the inorganic oxide component, or both, may have catalytic metals, either noble or non-noble metals, added thereto during this first step, by any suitable process. For example, a metal salt may be added to the acid used for peptizing the inorganic oxide if that method of preparation of the catalyst base is used, the zeolite may be ion-exchanged with a metal salt solution, etc. "Catalytic metals", as that term is used here, includes particularly metals from Groups VIB or VIII, as are well-known in the hydroprocessing art. Nickel and other hydrogenation metals are particularly suitable.

The inorganic oxide component of the catalyst base will generally be alumina, silica, magnesia, zirconia, beryllia, titania, or a mixture of two or more of these. Preferred are alumina, silica and mixtures thereof, including amorphous aluminosilicates.

The zeolite component will be one of those zeolites known to the hydroprocessing art. When a hydrocracking catalyst is being prepared, the zeolite will generally be a faujasitic or Y-type zeolite, especially a stabilized Y-type zeolite. A particularly preferred zeolite is the Y-type zeolite sold by Union Carbide Corporation as LZ-20 zeolite, which has a unit cell size of about 24.35 Å, a $SiO_2/Al_2O_3$ ratio greater than 5.0, a surface area greater than 500 $m^2/g$, and a sodium content of about 0.2 wt. %. LZ-20, which is stable in dry air to about 1000° C., may be used in the catalyst base without further stabilization, as illustrated in Example 1.

The ratio by weight of the inorganic oxide component to the zeolite component is generally between 1:4 and 4:1, preferably between 1:2 and 2:1.

The catalyst base, ready for impregnation, is then preferably hydrated to a moisture content of 5 to 20 wt. %, typically 15 wt. %, to reduce heat evolution and salt crystallization during impregnation.

The base is then impregnated with the noble metal, by the addition to the catalyst of such a volume of solution as will fill the catalyst pores and of noble metal concentration such as to achieve the desired final noble metal content on the catalyst. The solution volume should not be greater than the pore-filling volume, a volume which may be readily experimentally determined, and in generally 85 to 100%, preferably 90 to 95% of the pore volume. The solution contains a soluble salt of the desired noble metal, which is preferably palladium. The salt will generally be an organic amine complex salt of a mineral acid, such as $Pd(NH_3)_4(NO_3)_2$, $Pd(NH_3)_4Cl_2$, $Pd(en)_2(NO_3)_2$ [en = 1,2-diaminoethane], etc. Other catalytic metals may be co-impregnated, if desired, by the addition of similar soluble salts. The noble metal concentration will typically be such as to achieve a final concentration in the catalyst of 0.1 to 5.0 wt. %, preferably 0.3 to 2.0 wt. %, as reduced metal to total catalyst. Non-noble metals may be present, if desired, in the same or higher concentrations, e.g., up to about 10 wt. %.

The impregnating solution also contains a soluble ammonium salt, typically in a concentration at least 100% of the ion-exchange capacity of the zeolite component of the catalyst base. More preferably, the salt is present to at least 150%, especially 200% of the ion-exchange capacity, but substantially higher salt concentrations, e.g., above 500% of the ion-exchange capacity, are not believed desirable. An essential feature of the ammonium salts which are useful in the method of the invention is that they must, upon dissolution in a volume of water not exceeding the pore volume of the particulate catalyst base, be capable of satisfying at least 100%, and preferably 200% of the cation exchange capacity of the zeolite content of the base. In addition, it is desirable, though not essential, that the ammonium salts decompose to volatile products at a temperature not exceeding that used for final calcination of the catalyst. Representative of the ammonium salts which may be used in the method of this invention include nitrates, carbonates, bicarbonates and lower carboxylic acid salts such as acetates and formates. Particularly preferred are the ammonium salts of nitric and acetic acids and most preferred is nitric acid. The suitability of other salts which may have especial attributes in a particular manufacturing facility may be readily determined by preparation of a small batch of catalyst, followed by visual inspection of the finished product for radially uniform color.

The solution will have a pH such that the salts remain in solution, typically 8 to 10, which pH may be adjusted by the addition of bases such as ammonia.

The actual method of impregnation is conventional, e.g., vacuum impregnation or the use of a tumbling blender are suitable.

Following impregnation, the impregnated base should be allowed to stand before drying for a period of time sufficient for the attainment of an even distribution of the noble metal, i.e., for a time sufficient to produce in the finished, calcined catalyst a radial distribution of noble metal such that the concentration of noble metal at the center of the catalyst particles is generally at least 30% by weight of the concentration at the outside edges, preferably at least 80% and most preferably at least 90% of the concentration at the outside edges. For a 2.5 mm extrudate, this could be typically greater than 1 hour, especially greater than 2 hours. Standing for longer times is not especially detrimental, and times as long as 24 hours or more may be used, if convenient. It is desirable, however, that if the impregnated base is to stand for a long time, it should be enclosed or in a high humidity atmosphere, to prevent excessive or premature drying. A suitable time for a given base may be readily determined by those skilled in the art having regard to this disclosure, by, for example, drying at various times after impregnation, sectioning the resulting catalyst, and measuring the noble metal distribution.

Following the impregnation and standing, the catalyst is dried and calcined, preferably under such conditions that the unit cell size of the zeolite does not change. For example, these conditions may include drying at up to 150° C. for up to 12 hours, followed by calcination at 450° to 600° C. for up to four hours. The drying and calcination preferably take place under flowing air to minimize steam concentration.

The prepared catalyst may then be reduced with hydrogen as is conventional in the art and placed in service. Catalysts prepared in this way are economical in their preparation both for avoidance of a large number of preparative steps, and for 100% usage (no loss) of the noble metal. They also show extremely good distribution of the noble metal in the catalyst.

The invention will be specifically illustrated by the following Examples.

EXAMPLES

Example 1

A catalyst base comprising 60 wt. % LZ-20 zeolite and 40 wt. % alumina was prepared in the following manner. A mixture of 200 g (anhydrous basis) of each of Catapal ® SB and Kaiser "substrate grade" hydrated aluminas were peptized with a solution of 16 ml conc. nitric acid in 400 ml distilled water to produce a homogeneous, gelatinous mixture. 600 g (anhydrous basis) of Linde LZ-20 zeolite was then kneaded into the alumina mixture, and sufficient water (about 250 ml, total) added to form a paste of extrudable consistency. The paste thus formed was extruded through a 2.5 mm diameter die, and the extrudate dried at 230° C. for 2 hours and calcined at 600° C. for 2 hours. Both the drying and calcination were performed in dry air to decrease the partial pressure of water vapor surrounding the catalyst. The calcined base was rehydrated to about 15 wt. % moisture by allowing it to stand overnight in ambient air.

A portion of the catalyst base was impregnated with palladium in the following manner. To a quantity of the rehydrated base in a small vacuum impregnation apparatus was added an aqueous impregnating solution in sufficient volume to fill 90% of the water pore volume of the rehydrated base. The solution contained sufficient $Pd(NH_3)_4(NO_3)_2$ to produce a final Pd concentration of 0.5 wt. % (reduced metal relative to total catalyst weight), and a quantity of $NH_4NO_3$ equivalent to 200% of the ion exchange capacity of the zeolite component of the base. Following completion of the liquid addition, the moist impregnated catalyst was allowed to stand for two hours at room temperature. It was then dried at 120° and 230° C. and calcined at 500° C. for 2 hours at each temperature, a total of 6 hours.

Example 2 (Comparative)

A catalyst base prepared as in Example 1 was impregnated with palladium as in Example 1 with the difference that no $NH_4NO_3$ was present in the impregnating solution. The catalyst was dried and calcined as in Example 1.

While the compositions of the catalysts of Example 1 and Example 2 are essentially identical, the FIGURE shows that the radial distribution of the palladium (measured by electron microprobe analysis) in the two catalysts are very different. The solid line shows that for the catalyst of Example 1, the palladium concentration is substantially radially uniform; while the dashed line shows that for the catalyst of Example 2, with no added salt, the palladium concentration is extremely non-uniform, with essentially no palladium having penetrated more than 0.6 mm into the catalyst base.

When catalysts having uniform and non-uniform distributions of palladium are compared in service (in the hydrocracking of a denitrified vacuum gas oil), it is found that the catalyst having non-uniform palladium distribution shows substantial coking within the catalyst particles in the relatively low-palladium regions. The catalyst having uniform palladium distribution shows no such coking.

Example 3 (Comparative)

Powdered LZ-20 zeolite, of the type used in the preparation of the catalysts of Examples 1 and 2, has 1.0 wt. % of palladium added by slurry-type ion exchange. Using standard preparative techniques the ion-exchanged zeolite is combined with alumina powder containing 0.3 wt. % palladium and palladium-free alumina binder to prepare a finished catalyst containing 40 wt. % LZ-20, and having a total palladium loading of 0.52 wt. %. The palladium distribution in the catalyst is uniform since it depends only on the mixing of palladium-containing solids, but the preparative technique is more complex and subject to losses of palladium.

Samples of the catalysts of Examples 1 and 3 were tested in the extinction recycle hydrocracking of a denitrified vacuum gas oil (total pressure: 8.3 MPa, LHSV: 0.6 hr$^{-1}$, gas recycle: 1160 NL/L, per pass conversion: 70 LV %<260° C., catalyst temperature: 297° C.). The Table shows the no-loss yields, as weight percent based on fresh feed (by gas chromatograph simulated distillation), and the chemical hydrogen consumption.

TABLE

| Catalyst | Example 1 | Example 3 |
| --- | --- | --- |
| No-loss yields, wt. % FF: | | |
| $C_1$-$C_4$ | 8.0 | 7.5 |
| $C_5$-83° C. | 11.7 | 13.3 |
| 83° C.–127° C. | 26.3 | 28.7 |
| 127° C.–260° C. | 56.0 | 52.5 |
| Chemical $H_2$, NL/L | 212 | 216 |

A comparison of the two data indicates no substantial difference between the catalysts of Example 1 and Example 3 in their hydrocracking performance.

While the present invention has been particularly described with reference to specific embodiments, no limitation is intended by that description, and the invention should be limited in scope only by the following claims and their lawful equivalents.

What is claimed is:

1. In a process for preparing a catalyst comprising an inorganic oxide component, a zeolite component, and a noble metal component, which process comprises the steps of:
   (a) forming a particulate catalyst base containing the inorganic oxide component and the zeolite component;
   (b) impregnating the catalyst base with an impregnating solution containing a soluble salt of the noble metal component; and
   (c) drying and calcining the impregnated catalyst base; and
   the improvement which comprises:
   (a') using as the impregnating solution in step (b) a solution which also contains a soluble ammonium salt; and
   (b') allowing the impregnated base to stand, between steps (b) and (c), for a time sufficient to produce in the finished calcined catalyst a radial distribution of noble metal such that the concentration of noble metal at the center of the catalyst is at least about 30% of the concentration at the outside edges of the catalyst.

2. The process of claim 1 wherein the inorganic oxide component comprises alumina.

3. The process of claim 1 wherein the zeolite component comprises a Y-type zeolite.

4. The process of claim 3 wherein the zeolite component is LZ-20 zeolite.

5. The process of claim 1 wherein the ratio by weight of the inorganic oxide component to the zeolite component is between 1:4 and 4:1.

6. The process of claim 1 wherein the noble metal component comprises palladium.

7. The process of claim 6 wherein the soluble salt of the noble metal component is a salt of the tetra(ammine) palladium (II) cation.

8. The process of claim 1 wherein the noble metal component constitutes from 0.1 to 5.0 percent by weight of the catalyst.

9. The process of claim 1 wherein the ammonium salt is ammonium nitrate.

10. The process of claim 1 wherein the radial distribution of the noble metal is such that the concentration of noble metal at the center of the catalyst is at least about 80% of the concentration at the outside edges of the catalyst.

11. The process of claim 1 wherein the impregnating solution contains a quantity of ammonium salt equivalent to at least 100% of the ion-exchange capacity of the zeolite component.

12. The process of claim 1 wherein the impregnated base is allowed to stand for at least 1 hour before drying.

13. The process of claim 12 wherein the impregnated base is allowed to stand for at least 2 hours before drying.

14. The process of claim 1 wherein the catalyst base is rehydrated before impregnation.

15. The process of claim 14 wherein the rehydration is to a moisture level of at least 10 wt. % of the dry catalyst base.

16. The process of claim 14 wherein the rehydration is achieved by standing in ambient air.

17. In a process for preparing a catalyst comprising alumina, LZ-20 zeolite, and palladium, which process comprises the steps of:
 (a) forming a catalyst base containing the alumina and the LZ-20 zeolite;
 (b) impregnating the catalyst base with an impregnating solution containing a salt of the tetra(ammine) palladium (II) ion; and
 (c) drying and calcining the impregnated catalyst base; and
the improvement which comprises:
 (a') using as the impregnating solution in step (b) a solution which also contains a soluble ammonium salt; and
 (b') allowing the impregnated base to stand, between steps (b) and (c), for a time sufficient to produce in the finished calcined catalyst a radial distribution of noble metal such that the concentration of noble metal at the center of the catalyst is at least about 30% of the concentration at the outside edges of the catalyst.

18. A process of claim 17 wherein the radial distribution of the noble metal is such that the concentration of noble metal at the center of the catalyst is at least about 80% of the concentration at the outside edges of the catalyst.

19. A catalyst prepared by the process of claim 1.

20. A catalyst prepared by the process of claim 17.

* * * * *